United States Patent [19]

Patrick et al.

[11] Patent Number: 5,884,388
[45] Date of Patent: Mar. 23, 1999

[54] METHOD FOR MANUFACTURING A FRICTION-WEAR ALUMINUM PART

[75] Inventors: Edward P. Patrick, Murrysville; A. Victor Pajerski, New Kensington; Roger W. Kaufold, Coraopolis; Robert J. Speer, Upper Burrell, all of Pa.

[73] Assignee: Aluminum Company of America, Pittsburgh, Pa.

[21] Appl. No.: 859,195

[22] Filed: May 20, 1997

Related U.S. Application Data

[62] Division of Ser. No. 440,050, May 12, 1995, abandoned.

[51] Int. Cl.⁶ ........................................................ B21B 1/46
[52] U.S. Cl. ................ 29/527.2; 29/527.3; 188/218 XL; 205/109
[58] Field of Search ................................ 29/527.2, 527.3, 29/825; 188/218 XL; 205/109

[56] References Cited

U.S. PATENT DOCUMENTS

| | | |
|---|---|---|
| 3,787,305 | 1/1974 | Ballard . |
| 3,915,667 | 10/1975 | Ricks . |
| 4,290,510 | 9/1981 | Warren . |
| 4,612,256 | 9/1986 | Neuhäuser et al. . |
| 4,808,275 | 2/1989 | Ohzora et al. . |
| 4,908,261 | 3/1990 | Ishii et al. . |
| 5,224,572 | 7/1993 | Smolen, Jr. et al. . |
| 5,478,413 | 12/1995 | Mosser et al. . |

*Primary Examiner*—Carl J. Arbes
*Attorney, Agent, or Firm*—Gary P. Topolosky

[57] ABSTRACT

A friction-wear aluminum part which includes a metal substrate and friction-wear coating applied to at least a portion of the outer surface to said substrate. The coating is a mixture of both aluminum and stainless steel. On a preferred basis, the surface of the substrate is intentionally roughened or grooved to facilitate bonding of the coating thereto. An associated method is also disclosed.

22 Claims, 3 Drawing Sheets

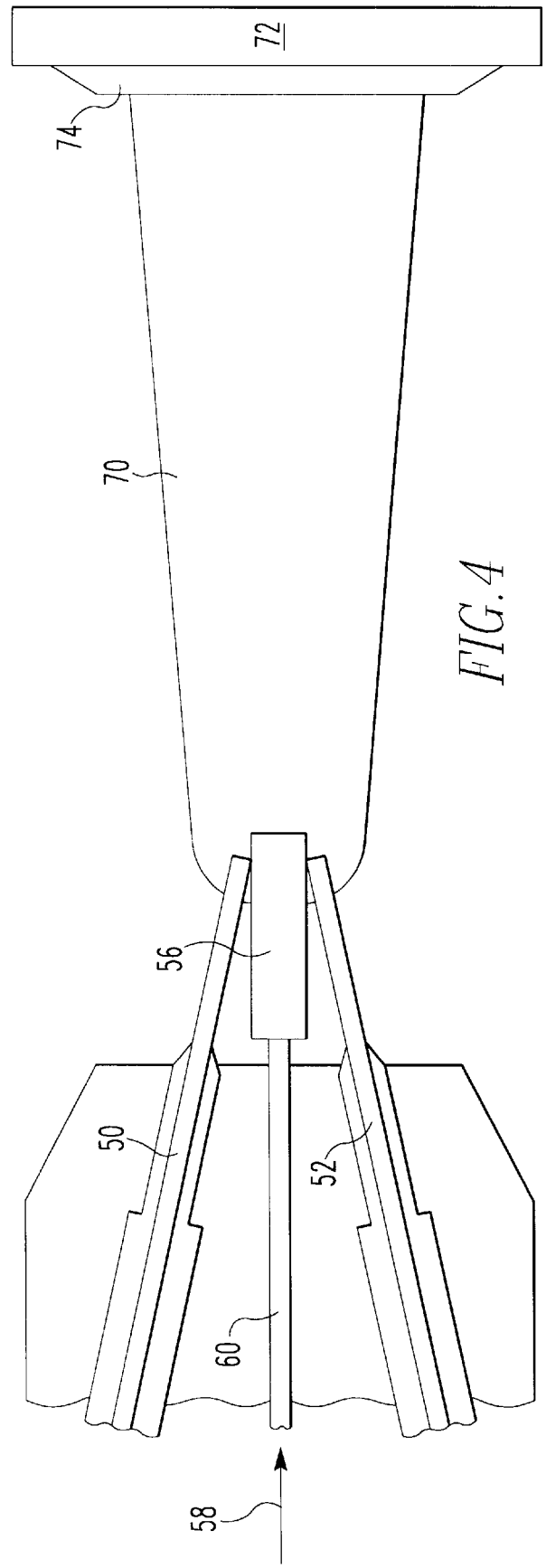

METHOD FOR MANUFACTURING A FRICTION-WEAR ALUMINUM PART

This application division of application Ser. No. 08/440,050 filed May 12, 1995, now abandoned.

BACKGROUND OF THE INVENTION

This invention relates to a friction-wear aluminum part and an associated method. More particularly, the invention relates to vehicle parts, such as brake rotors, brake drums, flywheels and the like which have at least a portion of their wear surface coated with a friction-wear coating. On a preferred basis, the brake parts and flywheels themselves are also made of aluminum alloys.

"Light-weighting" of vehicles, such as automobiles, is a process of substituting lighter materials, such as aluminum, for heavier materials, such as steel. Some of the obvious advantages of light-weighting are that fuel economy is improved and that less powerful engines are needed to propel such vehicles.

There are several cast iron or steel parts in a vehicle, including brake rotors, brake drums and flywheels. One light-weighting solution, therefore, would be to substitute a light-weight aluminum brake rotor for its heavier cast iron counterpart. However, attempts to make this substitution have not met with success because aluminum brake rotors tend to scuff and score more easily, thus making it less feasible to replace cast iron versions with aluminum equivalents.

Solutions to the latter problem have been proposed. One such proposal in U.S. Pat. No. 3,069,209 discloses a cast iron liner in a light-weight aluminum part, such as a brake drum. Still another proposed solution, in British Patent Application No. 2,268,511 A, sprays a simulated cast iron coating on a substrate before the coating is surface heat treated.

In order to be effective, any friction-wear coating must have good resistance to wear, good high temperature stability and thermal conductivity, good adhesion to aluminum, good machinability and finally solution potentials and coefficients of thermal expansion close to that of the aluminum substrate onto which the coating will be applied. The casting itself should be inexpensive and the coating cost effective to apply. Coatings with good high temperature stability are needed to resist melting and subsequent brake fade. Good thermal conductivity is also necessary to transfer frictional heat from the outer coating to the aluminum drum or rotor substrate. This coating must also have good adhesion to aluminum and a coefficient of thermal expansion so close to that of aluminum as to prevent bond failure during braking due to thermal shock. The coating solution potential must also be close to that of the aluminum substrate in order to prevent galvanic corrosion there between.

Despite the existence of prior art friction-wear parts and coatings, there still remains a need for automotive brake parts, especially aluminum versions thereof, having a friction-wear coating applied thereto which meet or exceed the above requirements, while at the same time being inexpensive to manufacture and coat.

SUMMARY OF THE INVENTION

The present invention has met or exceeded the above-described needs as well as others. In one embodiment, the invention includes a friction-wear part, such as a brake rotor, preferably comprising an aluminum substrate, onto which a friction-wear coating has been applied. The coating consists of a blend of aluminum and ferrous material, preferably pure aluminum, such as alloy 1100 (Aluminum Association designation) and 308 stainless steel, though it is to be understood that still other aluminum and/or steel compositions may be combined in accordance with this invention.

The invention further includes a friction-wear aluminum part, such as a brake drum or rotor, comprising an aluminum substrate and friction-wear coating applied to at least a portion of the outer surface to this aluminum substrate. Said outer surface is preferentially roughened, for-example, by being mechanically, chemically and/or electrically grooved to enhance coating reception thereon and secure bonding thereto.

Finally, a method of producing a friction-wear aluminum part is disclosed which comprises the steps of: (a) providing a metal substrate; (b) heating this substrate to one or more temperatures between about 200° to 1000° F. and; (c) applying a friction-resistant coating to at least a portion of this substrate's outer surface to produce the friction-wear part.

BRIEF DESCRIPTION OF THE DRAWINGS

A full understanding of the invention can be gained from the following description of preferred embodiments when read in conjunction with the accompanying drawings in which:

FIG. 4 is a schematic illustration of a thermal arc-spraying process.

DETAILED DESCRIPTION

This invention broadly relates to friction-wear aluminum parts. The following description will be specifically directed to vehicle parts, and more particularly, automotive brake parts. The invention should not be limited to just brake rotors, however. It is also useful for such other friction-wear parts as brake drums, flywheels and other vehicle parts which make repeated frictional contact with one another. Furthermore, the invention is not limited to vehicle parts, but will be understood to include any part which comes into frictional contact with another part or structure.

Figure 1:
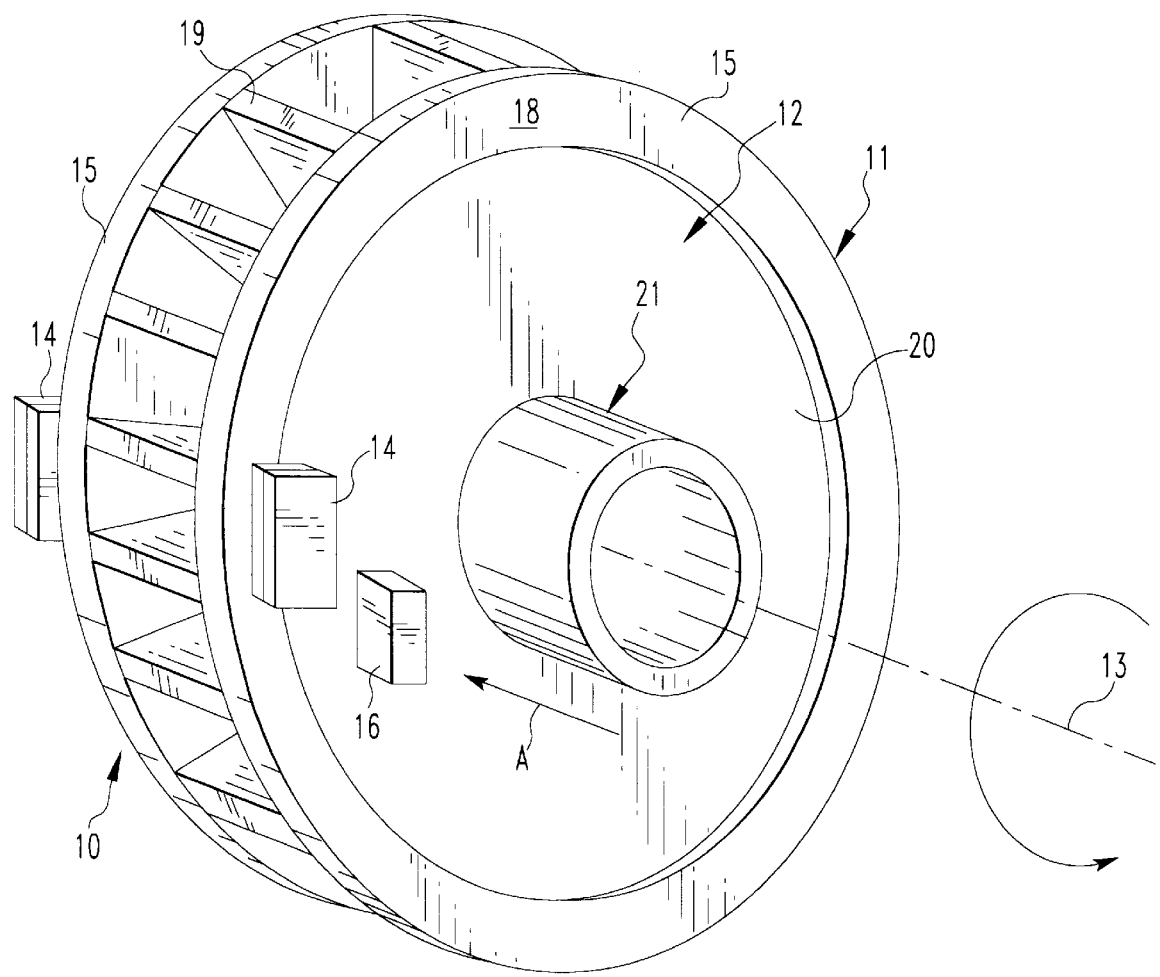
FIG. 1 is a perspective view of a brake rotor according to the invention.

Referring to FIG. 1, a standard disk brake assembly 10 is shown. The assembly 10 comprises a rotor 11 with hub assembly 12 mounted for rotation about an axis 13. At least one friction pad 14 is designed to be applied against the ring walls 15 of rotor 11 through a stationary caliper 16 or other force applying means for moving the pad 14 in a direction A to frictionally engage with and brake against friction-wear surface 18 of rotor 11.

While it may also be made from steel or cast iron material, rotor 11 of preferred embodiments of this invention is made from a cast aluminum alloy, such as A356 or A357 (Aluminum Association designations, the disclosures of which are fully incorporated by reference herein). A typical rotor design includes ring walls 15 facing opposite axial directions and separated by a plurality of vanes 19 for inducing airflow to cool the ring walls as the rotor 11 rotates. The vanes 19 and ring walls 15 are supported by an integral solid hub plate and cylinder sprocket 21 geared to the wheel axle.

Figure 2:
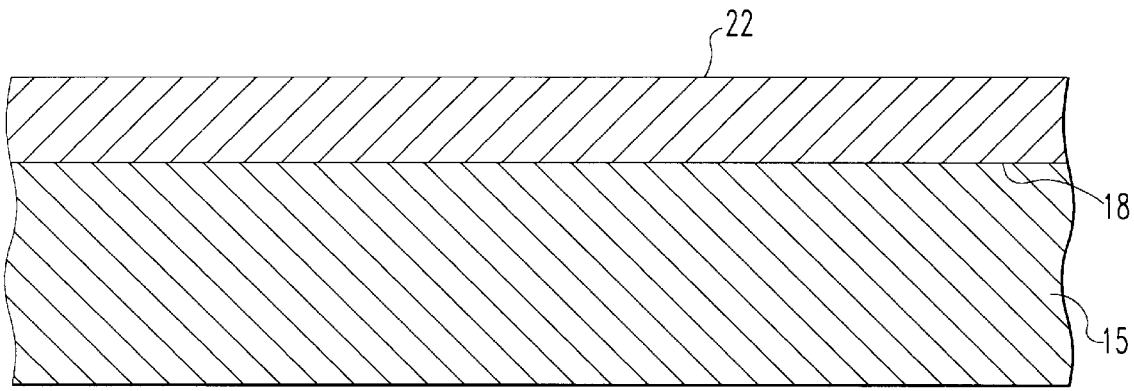
FIG. 2 is a cross-sectional view of a portion of the brake rotor of FIG. 1 showing the coating applied thereto.

A friction-wear coating 22, which is preferably thermally arc-sprayed onto the wear surface of rotor 11 (as discussed below), is applied to at least an outer portion of the friction-wear surface 18 of ring wall 15. Referring now to FIG. 2, preferred embodiments of this coating 22 are deposited to thicknesses of about 0.010 to 0.200 inches, and more preferably between about 0.030 to 0.090 inches. It is preferred to have at least 0.060 inches of coating 22 applied thereto to allow for a nominal amount of coating thickness that might be machined away before hitting the rotor substrate. The preferred coating composition is an aluminum/stainless steel blend, with one embodiment consisting of a substantially pure 1100 Series aluminum alloy (Aluminum Association designation) and 300 Series stainless steel, most preferably 308 Stainless Steel though it is to be understood that still other aluminum and ferrous-based alloys may be combined in accordance with this invention. And while this one embodiment was applied as a 50/50 (by volume) mixture of each constituent, it is to be understood that the precise ratios of component A to component B, or aluminum to stainless steel herein, may be intentionally varied to customize brake parts for a given vehicle depending on that vehicle's stopping, passenger and weight requirements and other desired wear properties. Other aluminum alloys which may be suitable for use in accordance with this invention include alloys 2319, 4043 or a hypereutectic Al—Si alloy. Alloy 1100 is generally preferred, however, due to its relatively high melting point.

Figure 3A:
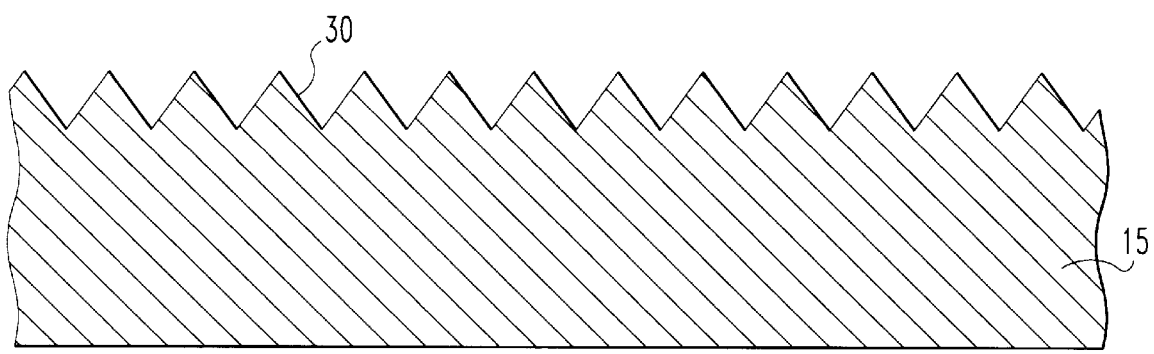
FIG. 3A is a cross-sectional view of the aluminum substrate showing an embodiment of machined-in grooves.
Figure 3B:
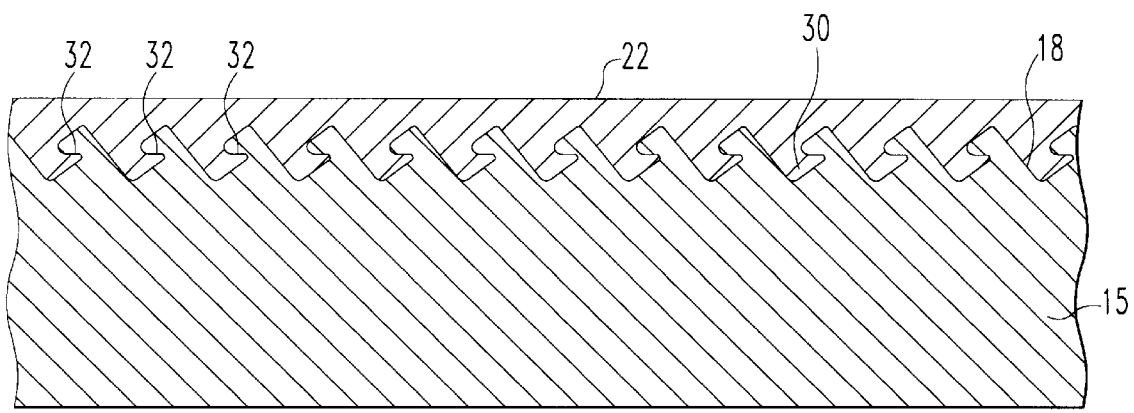
FIG. 3B is a cross-sectional view showing the brake rotor after the coating has been applied to the grooved substrate surface.

Referring now to FIGS. 3A and 3B, delamination of the coating 22 from the substrate by thermal shock can be greatly reduced by providing a series of intentional surface roughenings or grooves 30, to the rotor surface before coatings are thermally sprayed thereon. As can be seen in FIG. 3A, grooves 30 are preferably machined into the rotor surface before applying the coating 22 to the substrate, though on a lesser basis such grooves or other surface treatments may be cast, arc textured, or even chemically etched in an exterior rotor surface. In any event, these grooves provide means for locking or otherwise securing the coating onto the substrate's outer surface. Referring now to FIG. 3B, when coating 22 is applied to this roughened or grooved surface, this thermal application is believed to partially melt a portion of the surface and form a barbed hook 32 which further locks coating 22 both into and onto the substrate surface. Such barbed hooks may be alternately formed through one or more machining operations.

A preferred method of this invention involves providing a metal, preferably aluminum, substrate such as rotor 11. This substrate is then heated to one or more temperatures between about 200° to 1000° F., preferably between about 400° to 800° F., and most preferably between about 500° to 700° F. for an aluminum rotor or drum. While the substrate is generally maintained at this temperature, a coating 22, is thermally arc-sprayed onto a portion of surface, such as surface 18 to produce the friction-wear aluminum part The heating of the substrate minimizes radial cracks which may be caused by thermally induced stresses resulting from differences in the coefficients of expansion between substrate surface and applied coating. Heating of the substrate and subsequent spraying of the coating also places the coating 22 (which has a lower coefficient of thermal expansion than the substrate) into compression upon substrate cooling to further minimize tensile loading in service.

Thermal arc-spraying, described with reference to FIG. 4, may comprise the continuous feeding of two separate wires 50 and 52 of the same or different compositions into an atomizing nozzle 56 supplied with a jet of gas 58 through passageway 60. The two wire feeds are held at different electric potentials so that an electric arc generates between them. These wires 50 and 52 serve as consumable electrodes which melt continuously during the coating application process. The gas jets 58, usually of compressed air, then atomize these molten materials and accelerate their molten droplets in a spray stream 70 for deposit onto substrate 72 to create coating 74 thereby.

It will be appreciated that in one preferred embodiment of this invention, the wires 50 and 52 consist essentially of a 50/50 by volume mixture of 1100 aluminum and 308 stainless steel. Of course, other types of wire and the relative proportions of each component can be changed while still being within the spirit of this invention. One alternative means varies the thickness of feed wires and/or feed rates to impart different relative compositions onto a substrate, aluminum or otherwise. Furthermore, a single braided wire, comprised of a first metal strand (e.g., aluminum alloy 1100) and an intertwined second metal strand (e.g., 308 stainless steel) can be used to deposit coating blends onto the substrate according to the invention. Alternatively, a single wire having a first metal inner core (e.g., aluminum alloy 1100) clad with an outer second metal coating (such as 308 stainless steel) can be used.

It will be appreciated that the above described invention provides light-weight, cost efficient and effective alternatives to standard cast iron parts. The overall vehicle weight savings resulting therefrom should enhance fuel economy while not detrimentally affecting the vitally important functions of the brake and other automotive parts which this invention is intended to replace.

While specific embodiments of the invention have been disclosed, it will be appreciated by those skilled in the art that various modifications and alterations to those details could be developed in light of the overall teachings of the disclosure.

Accordingly, the particular arrangements disclosed are meant to be illustrative only and not limiting as to the scope of the invention which is to be given the full breadth of the appended claims and any and all equivalents thereof.

What is claimed is:

1. A method of producing a friction-wear automotive part comprises:

(a) providing a metal article with at least one outer surface;

(b) heating the outer surface of said metal article to one or more temperatures between about 200° to 1000° F.; and (c) applying a metallic, friction-wear coating to said heated outer surface to produce said friction-wear automotive part, said metallic coating containing both aluminum and steel.

2. The method of claim 1 which further includes roughening said outer surface prior to step (b).

3. The method of claim 2 wherein said roughening steps includes forming grooves having a sawtoothed cross-section in said outer surface.

4. The method of claim 2 wherein said grooves are machined into the outer surface of said metal article.

5. The method of claim 2 wherein said grooves are cast in the outer surface of said metal article.

6. The method of claim 2 wherein said grooves are arc textured on the outer surface of said metal article.

7. The method of claim 2 wherein said grooves are chemically or electrically etched into the outer surface of said metal article.

8. The method of claim 1, wherein step (c) includes applying said coating by a wire feed, thermal arc-spraying process.

9. The method of claim 8 wherein said arc-spraying process includes feeding a first wire of aluminum and a second wire of steel into a thermal arc spray.

10. The method of claim 9 wherein said coating is applied as a mixture containing about 30–70% by volume of an aluminum alloy and about 70–30% by volume of a steel alloy.

11. The method of claim 10 wherein said coating composition consists essentially about 50% by volume aluminum and about 50% by volume stainless steel.

12. The method of claim 10 wherein said aluminum alloy is a 1000 Series aluminum alloy (Aluminum Association designation).

13. The method of claim 12 wherein said aluminum alloy consists essentially of 1100 aluminum.

14. The method of claim 11 wherein said stainless steel is a 300 Series stainless steel.

15. The method of claim 9 wherein said stainless steel consists essentially of 308 stainless steel.

16. The method of claim 1 wherein step (b) includes heating said outer surface to one or more temperatures between about 400° to 800° F.

17. The method of claim 16 wherein step (b) includes heating said outer surface to one or more temperatures between about 500° to 700° F.

18. The method of claim 1 wherein step (c) includes applying said coating to a thickness of about 0.010 to 0.200 inches.

19. The method of claim 18 wherein step (c) includes applying said coating to a thickness of about 0.030 to 0.090 inches.

20. The method of claim 8 wherein the wire feed of said arc spraying process includes at least one aluminum strand and at least one steel strand braided together.

21. The method of claim 8 wherein the wire feed of said arc spraying process includes a single wire having an aluminum core and a steel cladding surrounding said aluminum core.

22. The method of claim 8 wherein the wire feed of said arc spraying process includes a single wire having a steel core and an aluminum cladding surrounding said steel core.

* * * * *